(No Model.) 6 Sheets—Sheet 1.
W. B. POTTER.
CONTROLLER FOR ELECTRIC MOTORS.
No. 524,396. Patented Aug. 14, 1894.
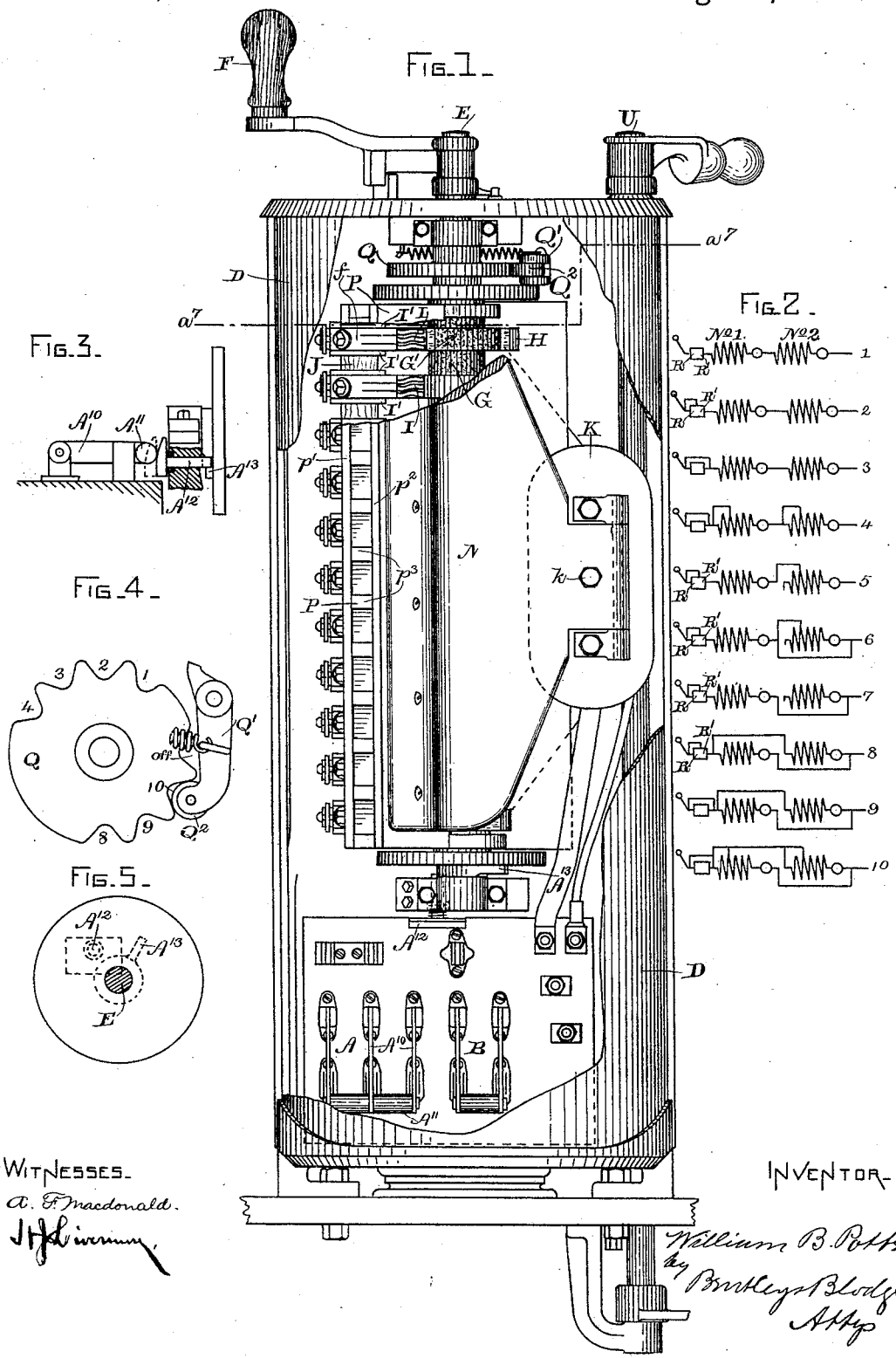
Witnesses—
A. F. Macdonald.
J. H. Livermay
Inventor—
William B. Potter
by Burkley Blodgett
Atty (No Model.) 6 Sheets—Sheet 2.
W. B. POTTER.
CONTROLLER FOR ELECTRIC MOTORS.
No. 524,396. Patented Aug. 14, 1894.
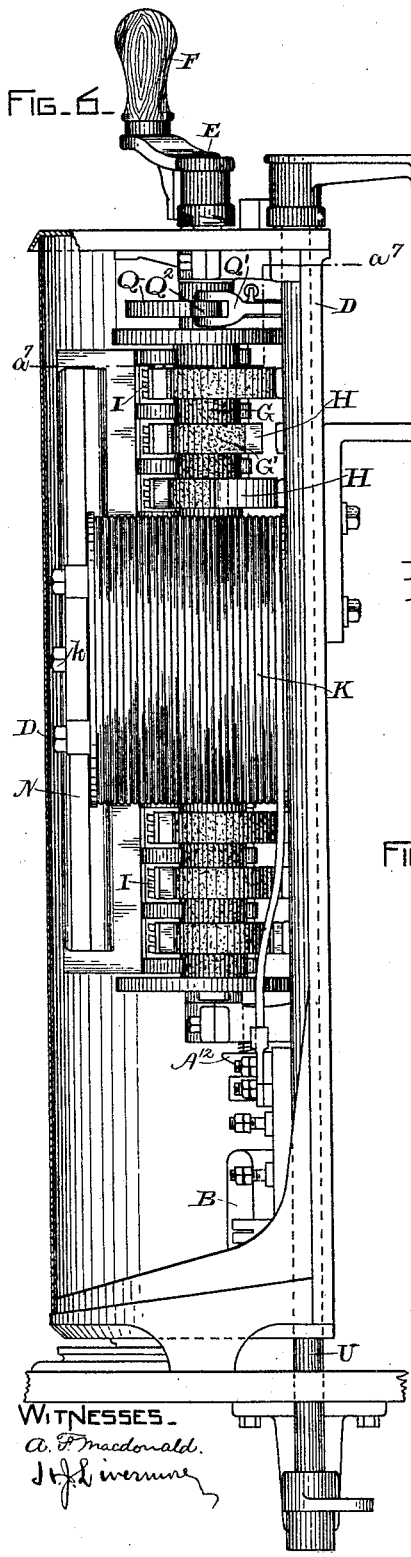
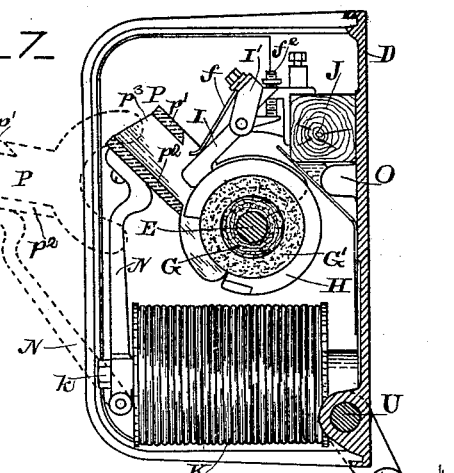
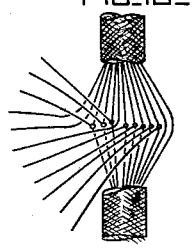
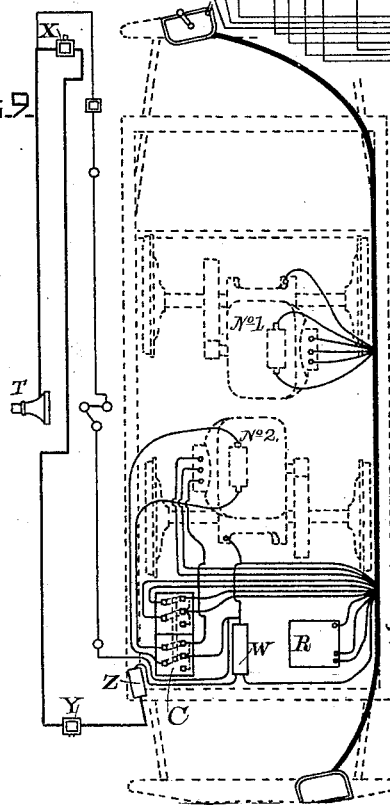
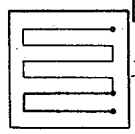
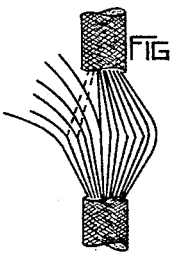
WITNESSES
A. F. Macdonald
J. H. Livermore
INVENTOR
William B. Potter
by Bartley & Blodgett
Attys (No Model.) 6 Sheets—Sheet 3.
W. B. POTTER.
CONTROLLER FOR ELECTRIC MOTORS.

No. 524,396. Patented Aug. 14, 1894.

(No Model.) 6 Sheets—Sheet 4.
W. B. POTTER.
CONTROLLER FOR ELECTRIC MOTORS.
No. 524,396. Patented Aug. 14, 1894.
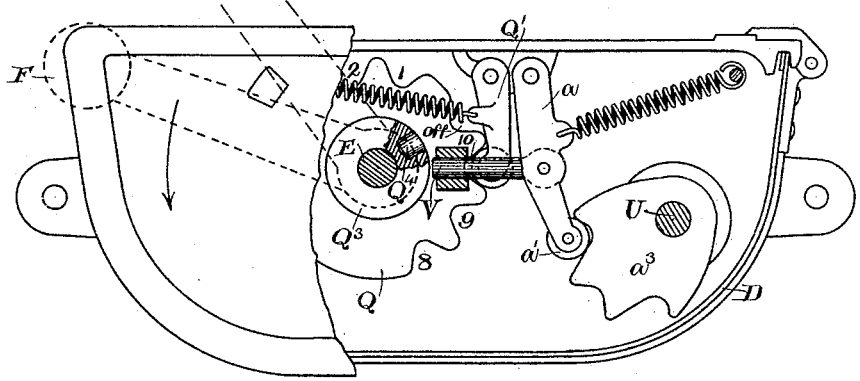
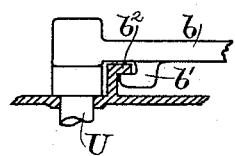
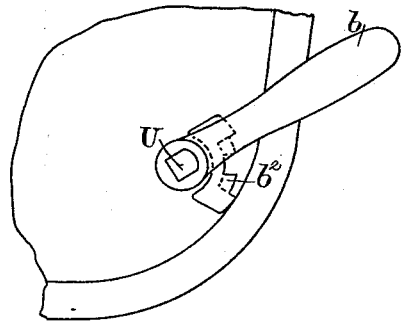
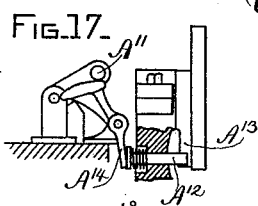
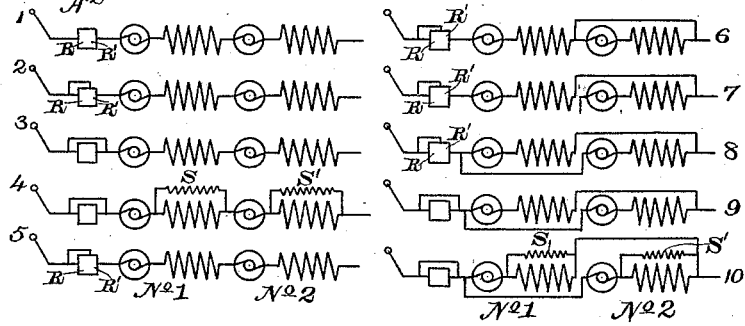
WITNESSES-
A. F. Macdonald.
J. J. Livermore.
INVENTOR-
William B. Potter
by Bentley & Blodgett
Attys.

(No Model.) 6 Sheets—Sheet 5.

W. B. POTTER.
CONTROLLER FOR ELECTRIC MOTORS.

No. 524,396. Patented Aug. 14, 1894.

WITNESSES
A. F. Macdonald
J. H. Liverman

INVENTOR
William B. Potter
by Bentley & Blodgett
Attys (No Model.)  6 Sheets—Sheet 6.
W. B. POTTER.
CONTROLLER FOR ELECTRIC MOTORS.
No. 524,396.  Patented Aug. 14, 1894.
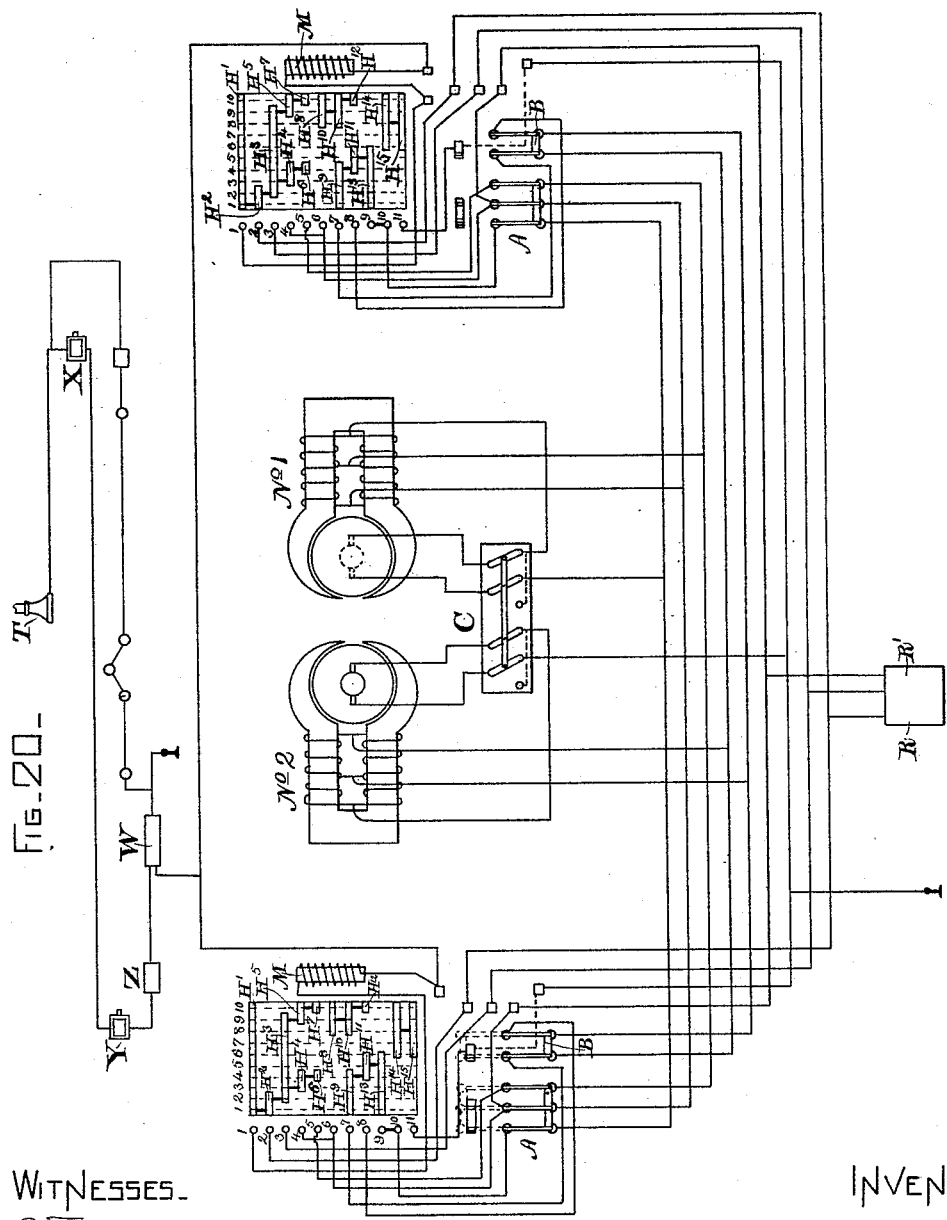
WITNESSES  
A. F. Macdonald.  
J. H. Livermore.
INVENTOR  
William B. Potter  
by Bentley & Blodgett  
Attys

UNITED STATES PATENT OFFICE.

WILLIAM B. POTTER, OF LYNN, ASSIGNOR TO THE GENERAL ELECTRIC COMPANY, OF BOSTON, MASSACHUSETTS.

CONTROLLER FOR ELECTRIC MOTORS.

SPECIFICATION forming part of Letters Patent No. 524,396, dated August 14, 1894.

Application filed December 21, 1893. Serial No. 494,286. (No model.)

*To all whom it may concern:*

Be it known that I, WILLIAM B. POTTER, a citizen of the United States, residing at Lynn, county of Essex, State of Massachusetts, have invented certain new and useful Improvements in Controllers for Electric Motors, of which the following is a specification.

My invention is illustrated in the accompanying drawings, in which—

Figure 13:
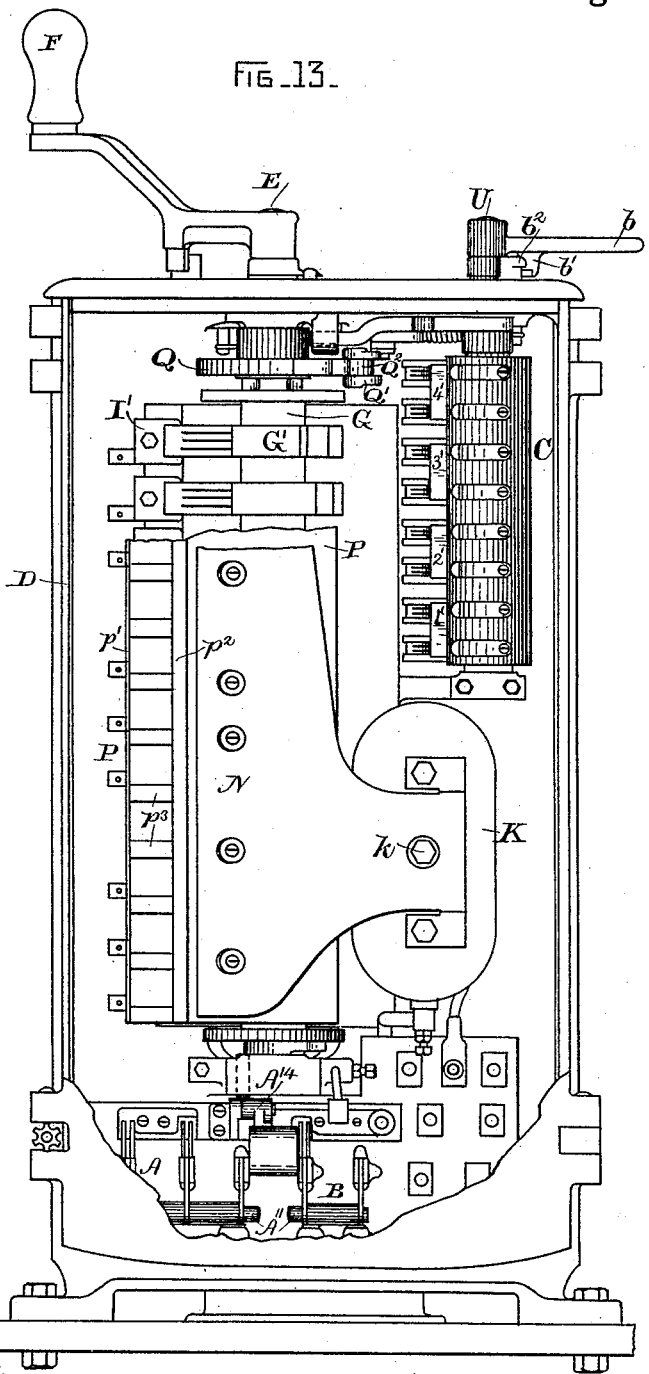
Figure 19:
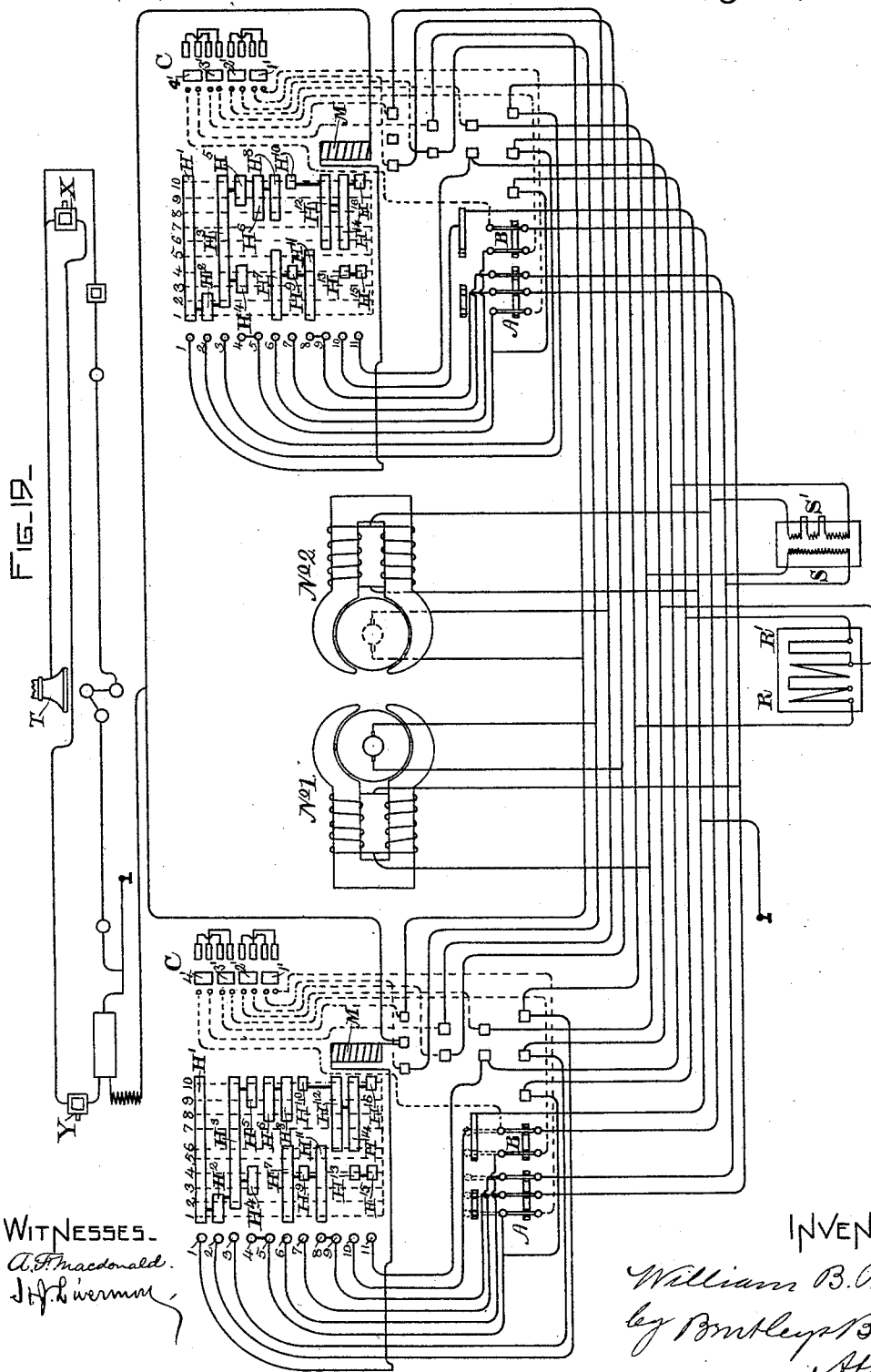

Figure 1 is an elevation partly in section of my controller. Fig. 2 is a series of diagrams showing several circuit connections established under the various conditions of the controller. Figs. 3, 4, and 5 are details. Fig. 6 is a side elevation, partly in section of the controller. Fig. 7, is a horizontal section on the line $a^7$, $a^7$ of Fig. 1. Fig. 8 is a plan of the contact cylinder and switch. Fig. 9 is a diagram showing my controller applied to an electric tram car, so that the same may be operated from either end. Figs. 10, 11 and 12 are details. Fig. 13 shows a modified form of the invention. Fig. 14 shows an alternative form of locking device. Figs. 15 and 16 are details of the same. Fig. 17 is a detail of the cut-out lock. Fig. 18 is a series of circuit connections produced by my alternative form of controller. Figs. 19 and 20 are diagrams of circuits upon a more extended scale.

My invention relates to a controller known as a "series parallel controller" by which two or more electric motors acting upon a common load, as for instance, an electric locomotive, may be coupled either in series or in parallel in order to give various degrees of speed and power to the driven mechanism.

My invention relates especially to the form of series parallel controller invented by W. H. Knight and myself, for which application for patent has already been made, the characteristic feature of said controller being that the motors are first placed in series with a resistance, the resistance is then cut out, and the motors changed from series to parallel by first shunting one motor, leaving the other motor in series with a resistance, and then placing the two motors in parallel, further regulation being effected by modifying the field magnet strength. The improvements which I have made, are, first, a modification of the magnet used to extinguish arcs on the contact terminals; second, the application of arc deflectors to the contact surface; third, an arrangement of the device by which one motor may be cut out and the controller used to regulate the remaining motor; fourth, the attachment of a locking device by which it is impossible to operate the reversing switch except at a time when the controller is in the proper condition; fifth, an improved reversing switch placed in the same box with the controller; sixth, means for detaining the switch at certain points selected as working positions, and lastly, certain details which will be hereinafter described and claimed.

Referring to the drawings, it will be apparent that my controller consists in general of a switch of the cylinder type, the rotation of which produces various combinations of the circuits terminating at the switch. The circuit terminals consist of a series of stationary contact springs placed in a line parallel with the axis of the cylinder and bearing upon suitable contact rings or plates, which are fastened to the cylinder so as to be rotated therewith and suitably insulated therefrom. This switch is inclosed in a suitable case provided with an external handle for rotating the cylinder.

In Figs. 1, 6, 7 and 13, D is the inclosing case which is rectangular in shape, having one flat side adapted to be placed in position against the dash board of a car or against any suitable supporting wall.

E is the shaft of the cylinder adapted to be operated by the main handle F.

G is an insulating cylinder having a series of insulating rings G' upon which are fastened contact plates H. These conducting plates are annular in shape, and form more or less complete rings, upon which a series of contact fingers respectively bear.

The contact fingers are marked I, and as shown in Fig. 7 are each pivoted in a bracket I' which is attached to an insulating block J and forms a circuit terminal, a binding post being attached thereto for connecting a line wire. They are, as shown, composed of strips of metal having a kink or bend in their length by which the furrowing or grooving of the contact strips is prevented. A spring $f$ constantly presses the contact finger against the contact plate H, and the range of movement of the finger is regulated by an adjusting screw $f^2$. It is obvious that as the cylinder is turned, a greater or less number of the fingers will be bearing upon the contact plates at any one time, and that if suitable connection is made between certain ones of the contact plates, the turning of the cylinder will establish a definite series of connections between the circuits which terminate at the respective contact fingers I.

For interrupting any arc which may be formed upon breaking contact between any of the fingers I and the contact plates H, I have provided an electro-magnet K which is placed in the inclosing case adjacent to the switch cylinder at its middle point and which is provided with a pivoted pole piece N extending laterally in each direction from the core of the magnet, and terminating at a point adjacent to the line of contact fingers I. The opposite end of the magnet core rests against the back plate of the inclosing case, so that the latter forms a part of the magnetic circuit. A ridge O is cast on the back plate of the inclosing case D at a point opposite the pivoted pole piece N. By this arrangement, the point at which the circuit is broken between fingers I and contact plate H is directly in the line of the magnetic circuit, and any arc will be interrupted, but to assist the magnetic effect upon the arc, I have provided at each finger I an arc deflector P consisting of a small chute or chimney of insulating material into which the arc is forced by what may be termed the "magnetic blast." This deflector P is constructed of two strips $p'$, $p^2$ of fiber; placed transversely to the line of any arc that would be formed, the latter being bolted to the pivoted pole piece N, and the two strips separated by a series of small partitions $p^3$ which divide the space between the two strips into a series of cells which form the chutes above referred to. The partitions $p^3$ have each two prongs curved to fit the circumference of the insulating cylinder G, as shown in Fig. 7, so that they may also assist in separating the successive contact plates H. It is obvious that the deflector P and pole piece N to which it is attached can be readily swung outward as indicated by the dotted lines in Fig. 7, so as to give ready access to the interior of the mechanism. The pivoted pole piece is normally held in position by a set screw $k$.

In operating the controller it is desirable that there should be some means of noting the different positions of the switch, where definite combinations of circuits are produced, and for this purpose I in some cases simply attach to the cylinder a star wheel Q, shown in detail in Fig. 4, and provide a spring pressed lever Q′ carrying a friction wheel $Q^2$ bearing in the notches of the star wheel. The notches of the wheel will be so shaped that a small amount of force will be required to turn the cylinder against the pressure of lever Q′ upon its periphery, and the cylinder will naturally come to rest at those positions in which the friction wheel $Q^2$ rests in the notches. I usually prefer to combine with this device a lock for the reversing switch. This switch is operated by a separate shaft U passing through inclosing case D parallel with the cylinder shaft E. The switch itself may be placed in the same casing with the switch cylinder, as shown in Fig. 13, or it may be placed at a distant point, in which case the shaft U passes directly through the inclosing case as in Fig. 1, and at its lower end is provided with connecting devices leading to the reversing switch. In either case the locking device can be used, an arrangement for this purpose being shown in Fig. 14. The star wheel Q in this case has attached to it a disk $Q^3$ in which is a socket $Q^4$. This socket is adapted to receive one end of a bolt V when it is rotated to a point opposite the end of the bolt. The other end of bolt V is pivoted to a lever $a$ which carries a friction wheel $a'$ engaging in a notched cam $a^3$ on shaft U. The lever $a$ bears against the cam $a^3$ substantially as the lever Q′ bears against the periphery of star wheel Q, but the cam can only be turned when the end of bolt V is opposite the socket $Q^4$, so as to be forced into it by the rotation of shaft U, and the consequent action of cam $a^3$ upon lever $a$.

There is only one position of the star wheel which will bring the socket $Q^4$ into line with bolt V, and that position is the one in which the handle F is in the upper extreme position, shown in dotted lines in Fig. 14, the lower extreme position being shown by dotted lines in the same figure and the two positions indicated show the full range of movement of the handle in both directions respectively. In the former position, the motor circuit is broken and the reversing switch can be turned to its intermediate position with the circuit broken. The friction wheel $a'$ rests then in the middle notch of cam $a^3$, and it will be impossible to turn handle F, as at that time the bolt V is in socket $Q^4$. When, however, the reversing switch is turned in one or the other of its two positions, the bolt V will be withdrawn, and the handle F can be turned. There is also provided a removable handle for the shaft U, which, however, can only be taken off when the reversing switch is in its middle position with the circuit broken. In Figs. 15 and 16, $b$ is the handle which has a lug $b'$ extending under a flange $b^2$ on the cover of the inclosing case. This flange $b^2$ is cut away at its center so that handle $b$, when in its intermediate position, can be lifted off. The object of the locking apparatus thus described is to insure that the controller at one end of the car is left locked with the circuit broken both at the reversing switch and at the switch cylinder, and also to prevent reversals of the motors except when the circuit is broken. As only one handle is provided for each car and there is a controller at each end of the car, it is necessary for the driver, when leaving one end of the car, to throw his switch to the middle position before he can remove the handle and proceed with it to the opposite end of the car, and as above described, when in its middle position the reversing switch is open and the switch cylinder locked. Upon removing the handle and proceeding to the opposite end of the car, it is necessary for him to first throw his reversing switch in one direction or the other before he can operate his switch cylinder to control the car.

In Fig. 2, I have shown a series of diagrams illustrating the successive connections which are established by my controller. These may be modified somewhat, as for instance, to the series shown in Fig. 18, but the only difference between the two is that the field magnet strength in the former case is varied by short-circuiting a part of the coils, and in the latter case by shunting them with a resistance; either method may be employed. It is hardly necessary to describe in detail the route of the current in each position of the controller, as it will be readily understood by any one skilled in the art, how the contact plates of the switch cylinder may be suitably arranged to produce the combinations shown in Fig. 2 or any other combination which may be desired. I have, however, to avoid any uncertainty, shown in Fig. 8 a plan of the switch cylinder as arranged to produce the combinations of Fig. 2. In said Fig. 8, the contact fingers I are numbered from 1 to 11 inclusive, and the heavy vertical lines indicate the respective contact plates H, while the successive positions of the fingers on the plates are indicated by the dotted horizontal lines numbered from 1 to 10. The plates H are interconnected as indicated in the figure.

Of Fig. 9 it may also be stated that the two motors marked respectively "No. 1" and "No. 2" are geared to opposite axles of a railway car, and the two controllers on the two ends of the car respectively, are joined by a cable containing a number of wires, and from intermediate points of the cable connections are taken out to the motors, reversing switches, &c.

Fig. 20 is a general diagram combining the partial diagrams of Figs. 8 and 9. Referring to diagram, Fig. 20, with the brushes on the line 1—1, the circuit will be as follows: trolley T, switches X and Y, to cut-out Z, to lightning-arrester W, to magnet M, to brush 1, to block H', cross-connected to block $H^2$, to brush 2, through the resistances R, R', to switch A, to field of motor No. 1, to reversing switch C, to armature of motor No. 1, to reversing switch C, to switch A, to brush 10 connected to brush 9, to block $H^{13}$, cross-connected to block $H^9$, to brush 7, to switch B, to field of motor No. 2, to reversing switch C, to armature of motor No. 2, to reversing switch C, to ground. With the circuits arranged as above, the two motors are in series with all the resistance in.

With the brushes on the line 2—2, the circuit will be as follows: trolley T, switches X and Y, to cut-out Z, to lightning-arrester W, to magnet M, to brush 1, to block H', cross-connected to block $H^3$, to brush 3, to resistance R', to switch A, to field of motor No. 1, to reversing switch C, to armature of motor No. 1, to reversing switch C, to switch A, to brush 10 connected to brush 9, to block $H^{13}$, cross-connected to block $H^9$, to brush 7, to switch B, to field of motor No. 2, to reversing switch C, to armature of motor No. 2, to reversing switch C, to ground. With the circuits arranged as above, the two motors are in series with a part of the resistance cut out.

With the brushes on the line 3—3, the circuit will be as follows: trolley T, switches X and Y, to cut-out Z, to lightning-arrester W, to magnet M, to brush 1, to block H', cross-connected to block $H^4$, to brush 4, connected to brush 6, to switch A, to field of motor No. 1, to reversing switch C, to armature of motor No. 1, to reversing switch C, to switch A, to brush 10, connected to brush 9, to block $H^{13}$, cross-connected to block $H^9$, to brush 7, to switch B, to field of motor No. 2, to reversing switch C, to armature of motor No. 2, to reversing switch C, to ground. With the circuits arranged as above, the two motors are in series with the resistance out.

With the brushes on the line 4—4, the circuit will be as follows: trolley T, switches X and Y, to cut-out Z, to lightning-arrester W, to magnet M, to brush 1, to block H', cross-connected to blocks $H^4$ and $H^6$. Here the circuit divides, one path being through brush 4, connected with brush 6, to switch A, to field of motor No. 1, and the other being through block $H^6$, to brush 5, to switch A, to loop on motor No. 1, through a part of the field, and uniting again with the main circuit, to the reversing switch C, to the armature of motor No. 1, to reversing switch C, to switch A, to brush 10 connected to brush 9, to block $H^{13}$, where the circuit divides, one path being through block $H^9$, which is cross-connected to block $H^{13}$, to brush 7, to switch B, to field of motor No. 2, and the other through block $H^{13}$, cross-connected to block $H^{11}$, to brush 8, to switch B, to loop of motor No. 2, through a part of the field and uniting with the main circuit, to the reversing switch C, to armature of motor No. 2, to reversing switch C, to ground. With the brushes arranged as above, the two motors are in series with the resistance out, and a shunt placed around a portion of each motor field.

With the brushes on the line 5—5, the circuit will be as follows: trolley T, switches X and Y, to cut-out Z, to lightning-arrester W, to magnet M, to brush 1, to block H', cross-connected to block $H^3$, to brush 3, to resistance R', to switch A, to field of motor No. 1, to reversing switch C, to armature of motor No. 1, to reversing switch C, to switch A, to brush 10 connected to brush 9, to block $H^{13}$, cross-connected to block $H^{11}$, to brush 8, to switch B, to loop of motor No. 2, through a part of the field, to reversing switch C, to the armature of motor No. 2, to reversing switch C, to ground. With the circuits arranged as above, the resistance is partially out, and motors No. 1 and No. 2 are in series with it, and a part of the field of motor No. 2 is open circuited.

With the brushes on the line 6—6, the circuit will be as follows: trolley T, switches X and Y, to cut-out Z, to lightning-arrester W, to magnet M, to brush 1, to block H', cross-connected to block H³, to brush 3, to resistance R', to switch A, to field of motor No. 1, to reversing switch C, to armature of motor No. 1, to reversing switch C, to switch A, to brush 10, where the circuit divides, one path being through block H¹⁴, cross-connected to block H¹⁵, to brush 11, to ground; the other path being from brush 10 connected to brush 9, to block H¹³, cross-connected to block H¹¹, to brush 8, to switch B, to loop of motor No. 2, through a portion of the field, to reversing switch C, to armature of motor No. 2, to reversing switch C, to ground. With the circuits arranged as above, the resistance is partially out, and motors No. 1 and No. 2 are in series with a part of the field of motor No. 2 open circuited, and a shunt placed completely around the motor, thus connecting motor No. 1 directly to ground.

With the brushes on the line 7—7, the circuit will be as follows: trolley T, switches X and Y, to cut-out Z, to lightning-arrester W, to magnet M, to brush 1, to block H', cross-connected to block H³, to brush 3, to resistance R', to switch A, to field of motor No. 1, to reversing switch C, to armature of motor No. 1, to reversing switch C, to switch A, to brush 10, to block H¹⁴, cross-connected to block H¹⁵, to brush 11, to ground. With the circuits arranged as above, the resistance is partially out, and motor No. 1 is in series with it, and connected directly to ground; motor No. 2 is open circuited.

With the brushes on the line 8—8, the circuit will be as follows: trolley T, switches X and Y, to cut-out Z, to lightning-arrester W, to magnet M, to brush 1, to block H', cross-connected to block H³, to brush 3, to resistance R'. Here the circuit divides, one path being to switch A, through field of motor No. 1, to reversing switch C, to armature of motor No. 1, to reversing switch C, to switch A, to brush 10, to block H¹⁴, cross-connected to block H¹⁵, to brush 11, to ground, and the other from R', to brush 6, to block H⁸, cross-connected to block H¹⁰, to brush 7, to switch B, to field of motor No. 2, to reversing switch C, to armature of motor No. 2, to reversing switch C, to ground. With the circuits arranged as above, the resistance is partially out, and the two motors are connected in multiple.

With the brushes on the line 9—9, the circuit will be as follows: trolley T, switches X and Y, to cut-out Z, to lightning-arrester W, to magnet M, to brush 1, to block H', cross-connected to block H⁵, to brush 4 connected to brush 6, where the circuit divides, one path being to switch A, through field of motor No. 1, to reversing switch C, to armature of motor No. 1, to reversing switch C, to switch A, to brush 10, to block H¹⁴, cross-connected to H¹⁵, to brush 11, to ground, and the other from brush 6, to block H⁸, cross-connected to block H¹⁰, to brush 7, to switch B, to field of motor No. 2, to reversing switch C, to armature of motor No. 2, to reversing switch C, to ground. With the circuits arranged as above the resistance is out, and the motors are connected in multiple.

With the brushes on the line 10—10, the circuit will be as follows: trolley T, switches X and Y, to cut-out Z, to lightning-arrester W, to magnet M, to brush 1, to block H', cross-connected to block H⁵, where the circuit divides, one path being through brush 4 connected to brush 6. Here the circuit divides again, the main circuit being to switch A, through the field of motor No. 1. Going back to where the circuit first divides at H⁵, there is a shunt path, which is connected to block H⁷, to brush 5, to switch A, to loop on motor No. 1, through a part of the field, where it unites with the main circuit, to the reversing switch C, to armature of motor No. 1, to reversing switch C, to switch A, to brush 10, to block H¹⁴, cross-connected to block H¹⁵, to brush 11, to ground. Going back to block H⁵, the circuit is as follows: block H⁵, to brush 4 connected to brush 6, to block H⁸, cross-connected to block H¹⁰, and here the circuit divides again, the main path being through brush 7, to switch B, to field of motor No. 2, and the shunt path, from block H¹⁰, cross-connected to block H¹², to brush 8, to switch B, to loop on motor No. 2, through a part of the field, and here it unites with the main circuit, to reversing switch C, to armature of motor No. 2, to reversing switch C, to ground. With the circuits arranged as above, the resistance is out, and motors No. 1 and No. 2 are in multiple with a part of each field shunted. Thus it will be seen that the several conditions of the circuits indicated in Fig. 2 have been successively brought about by the rotation of the switch cylinder.

It should be noted at this point that not all the circuit conditions of Fig. 2 are such that should be maintained for an indefinite period. Certain of these conditions are only temporary, which exist in passing from one to another of the conditions which may be comparatively permanent. The latter conditions correspond to those positions of the switch known as running positions. That is, they are conditions which afford successive regulating steps, and may be maintained so long as the driver desires to proceed at the rate of speed that these several conditions give. The other conditions correspond to what is known as intermediate conditions of the switch cylinder, and are conditions which should be maintained only for a short time while the switch is passing from one running position to another. In order that there shall be no uncertainty as to the running positions, I have so shaped the star wheel Q, Fig. 4, that the several notches with which the friction wheel $Q^2$ engages, shall correspond to the running positions. Thus, referring to Fig. 2, the running positions are those numbered 1, 2, 3, 4, 8, 9, 10; 5, 6 and 7 being intermediate positions. The wheel Q is therefore so shaped that there shall be no notch between the positions 4 and 8, and the driver will know that he is not to allow his switch cylinder to remain for any length of time at the intermediate positions between 4 and 8, but is to turn until he feels that the friction wheel $Q^2$ has dropped into a notch. In Fig. 4, the wheel $Q^2$ is in notch No. 10, which is the position giving the highest speed. An adjacent notch is provided into which the wheel drops when the motors are at rest with the circuit broken. It is, of course, impossible for the driver to pass directly from notch 10 to the "off" notch, as the one last described is designated, as there is a lug on the under side of the handle which engages with a projection on the top of the inclosing case, which stops the rotation so that it is only possible to pass from notch 10 to the "off" notch by a reverse movement of the handle through the positions preceding 10 until the last of "off" position is reached.

In Fig. 18, I have shown a set of conditions which form a modification of those in Fig. 2, differing therefrom in respect to the method of changing the field magnet strength, there being in the latter case a shunt containing a resistance connected between the terminals of the field magnet to reduce the amount of current flowing in their coils, thereby reducing their magnetic strength.

In Fig. 19, I have shown a diagram indicating all of the circuits with the controlling switch, it being understood that the diagram of Fig. 19 presupposes an arrangement in practice like that shown in Fig. 9, but it is not essential to indicate for a second time the car body and the motors driving the respective axles. I have also shown in Fig. 19, a reversing switch like that of Fig. 13, this switch being included in the same box with the controller switch, and of the same general construction. That is, there are a series of stationary contact fingers connected to the circuit terminals and a corresponding series of contact plates on the cylinder which serve to combine in any desired manner the circuits terminating at the contact fingers. This modified series of circuit connections may be traced in detail with reference to Fig. 19 as follows:

With the brushes on the line 1—1, the circuit will be as follows: trolley T, to magnet M, to brush 1 contact block H', cross-connected to block $H^2$, to brush 2, to resistance R, R', switch A, to reversing switch C contact 1', armature of motor No. 1, to reversing switch C contact 2', to field of motor No. 1, to switch A, to brush 9 cross-connected to brush 8, to block $H^{11}$, cross-connected to block $H^7$, to brush 6, to switch B, to reversing switch C contact 3', to armature of motor No. 2, to reversing switch C contact 4', to switch B, to field of motor No. 2, to ground. With the circuit arranged as above the two motors are connected in series with full resistance.

With the brushes on the line 2—2, the circuit will be the same as above except that a part of the resistance is out.

With the brushes on the line 3—3, the circuit will be as follows: trolley T, to magnet M, to brush 1, to block H', cross-connected to block $H^4$, to brush 4 connected to brush 5, to switch A, reversing switch C contact 1', to armature of motor No. 1, to reversing switch C contact 2', to field of motor No. 1, to switch A, to brush 9 connected to brush 8, to block $H^{11}$, cross-connected to block $H^7$, to brush 6, to switch B, to reversing switch C contact 3', to armature of motor No. 2, to reversing switch C contact 4', to switch B, to field of motor No. 2, to ground. With the circuits arranged as above the motors are in series with the resistance all out.

With the brushes on the line 4—4, the circuit will be as follows: trolley T, to magnet M, to brush 1, to block H', cross-connected to block $H^4$, to brush 4 connected to brush 5, to switch A, to reversing switch C contact 1', to armature of motor No. 1, to reversing switch C contact 2', to field of motor No. 1; here the circuit divides, one path being through the field and the other through the shunt resistance S, to switch A, to brush 7, to block $H^9$. They unite again through the connection between brushes 9 and 8 and cross-connection between blocks $H^7$, $H^9$ and $H^{11}$, cross-connected to block $H^7$, to brush 6, to switch B, to reversing switch C contact 3', to armature of motor No. 2, to reversing switch C contact 4', to switch B; here the circuit divides again, one path being through field of motor No. 2 to ground, the other through shunt resistance S', to brush 11, to block $H^{15}$ cross-connected to block $H^{13}$, to brush 10, to ground. With the circuit arranged as above, the motors are in series with the resistance out, and a resistance in shunt placed around each motor field.

With the brushes on the line 5—5, the circuit will be as follows: trolley T, to magnet M, to brush 1, to block H', cross-connected to block $H^3$, to brush 3, to resistance R', to switch A, to reversing switch C contact 1', to armature of motor No. 1, to reversing switch C contact 2', to field of motor No. 1, to switch A, to brush 9 connected to brush 8, to block $H^{11}$, cross-connected to block $H^7$, to brush 6, to switch B, to reversing switch C contact 3', to armature of motor No. 2, to reversing switch C contact 4', to switch B, to field of motor No. 2, to ground. With the circuits arranged as above, the two motors are in series with a part of the resistance out.

With the brushes on the line 6—6, the circuit will be as follows: trolley T, to magnet M, to brush 1, to block H′, cross-connected to block H³, to brush 3, to resistance R′, to switch A, to reversing switch C contact 1′, to armature of motor No. 1, to reversing switch C contact 2′, to field of motor No. 1, to switch A, to brush 9; here the circuit divides, one path being through brush 9, to block H¹² cross-connected to block H¹⁴, to brush 10, to ground, and the other through brush 9 connected to brush 8, to block H¹¹, cross-connected to block H⁷, to brush 6, to switch B, to reversing switch C contact 3′, to armature of motor No. 2, to reversing switch C contact 4′, to switch B, to field of motor No. 2, to ground. With the brushes arranged as above, the resistance is partially out, motors No. 1 and No. 2 are connected in series with it, and a shunt is placed around motor No. 2.

With the brushes on the line 7—7, the circuit will be as follows: trolley T, to magnet M, to brush 1, to block H′, cross-connected to block H³, to brush 3, to resistance R′, to switch A, to reversing switch C contact 1′, to armature of motor No. 1, to reversing switch C contact 2′, to field of motor No. 1, to switch A, to brush 9, to block H¹² cross-connected to block H¹⁴, to brush 10, to ground. With the brushes arranged as above, the resistance is partially out, and motor No. 1 is connected in series with it to ground, leaving motor No. 2 open circuited. The object of having this long step between 4 and 8 is to give time for the circuit to open when returning from multiple to series position and thus avoid short circuiting the motors. This step will be more clearly seen by referring to Sheet 1 where the star wheel is shown which regulates the movement of the cylinder step by step.

With the brushes on the line 8—8, the circuit will be as follows: trolley T, to magnet M, to brush 1, to block H′, cross-connected to block H³, to brush 3, to resistance R′; here the circuit divides, one path being through brush 5, to block H⁶, cross-connected to block H⁸, to brush 6, to switch B, to reversing switch C contact 3′, to armature of motor No. 2, to reversing switch C contact 4′, to switch B, to field of motor No. 2, to ground. Going back to resistance R′, the other circuit is as follows: switch A, reversing switch C contact 1′, to armature of motor No. 1, to reversing switch C contact 2′, to field of motor No. 1, to switch A, to brush 9, to block H¹² cross-connected to block H¹⁴, to brush 10, to ground. With the circuit arranged as above, the two motors are connected in multiple with a part of the resistance out.

With the brushes on the line 9—9, the circuit will be as above with the exception that all the resistance is out.

With the brushes on the line 10—10, the circuit will be as follows: trolley T, to magnet M, to brush 1, to block H′, cross-connected to block H³, cross-connected to block H⁵, to brush 4 connected to brush 5; where the circuit divides, one path being through switch A, reversing switch C contact 1′, to armature of motor No. 1, to reversing switch C contact 2′; here the circuit divides again, one path being through field of motor No. 1, to switch A, to brush 9, to block H¹² cross-connected to block H¹⁴, to brush 10, to ground; the other path being through shunt resistance S, to switch A, to brush 7, to block H¹⁰, cross-connected to block H¹⁴, to brush 10, to ground. Going back to brush 5 where the circuit first divides, the circuit will be as follows: brush 5, to block H⁶ cross-connected to block H⁸, to brush 6, to switch B, to reversing switch C contact 3′, to armature of motor No. 2, to reversing switch C contact 4′, to switch B; where the circuit divides again, one path being through field of motor No. 2, to ground, the other being through shunt resistance S′, to brush 11, to block H¹⁶ cross-connected to block H¹⁴, to brush 10, to ground. With the circuits arranged as above, the two motors are connected in multiple with the resistance out, and a resistance in shunt placed around each motor field.

There remains to be described the cut-out switch, by which either motor may be cut out of circuit and the cylinder automatically locked, so that it cannot be turned beyond the fourth notch, whereby the motor that is left in circuit is simply regulated by means of the resistance. These switches are marked A and B, and are shown in front elevation in Fig. 1, where they are located on the back plate of the inclosing case at a point below the cylinder.

The diagrams of the circuit connections of the switches are shown in Figs. 8 and 20 for one form, and Fig. 19 for the other form of the controller.

The switch A which cuts out motor No. 1, consists of three pivoted bars and a common handle therefor, and the switch B which cuts out motor No. 2 is similarly constructed with two bars.

The switches are normally in the dependent positions shown in Fig. 1, in which case they have no influence upon the circuits. When it is desirable to operate either of them, they are lifted into a vertical position as shown by the dotted lines in Fig. 8. When either switch is first lifted it throws a stop into the path of rotation of the cylinder and thus locks it so that it cannot be turned beyond the fourth notch. The mechanism of this lock is shown in Fig. 1 and more in detail in Fig. 3. In the latter figure, A¹⁰, is one of the bars of the switch, and A¹¹ the handle. When the switch is in the elevated position shown, the handle comes into contact with a bolt A¹² and forces it inward, so that it forms a stop for an arm A¹³ (Figs. 1 and 3) on the shaft of the cylinder. The rotation of the cylinder will therefore be limited, as appears more clearly in Fig. 5, in such a manner that with one motor only in circuit, it can only regulate that motor by means of the resistance.

In Fig. 13 is shown another form of lock, the details of which are illustrated in Fig. 17. In this figure there is simply an intermediate lever between the handle $A^{11}$ and the bolt $A^{12}$. This intermediate piece is marked $A^{14}$. The outer end of piece $A^{14}$ is cam shaped, so that the upward movement of the switch bar, and the consequent engagement of lever handle $A^{11}$ with the cam surface of $A^{14}$, forces the outer end of the said piece down and the inner end up, which acts thereby to put the bolt $A^{12}$ into the path of the arm $A^{13}$. When the form of switch which produces the circuit connections shown in Fig. 2 is employed, the circuit in detail will be as follows, it being understood that the switch A cuts out motor No. 1, and the switch B motor No. 2 in each instance.

With the switch A, Fig. 8, thrown up into position shown in dotted lines, motor No. 1 will be cut out and the cylinder can only revolve as far as the fourth notch on account of the lock. With the switch A arranged as above, and the brushes on the line 1—1, (Fig. 20) the circuit will be as follows: trolley T, switches X and Y, to cut-out Z, to lightning-arrester W, to magnet M, to brush 1, to block H′, cross-connected to block H², to brush 2, to resistance R, R′, to middle pole of switch A, cross-connected to first pole, to brush 10 connected to brush 9, to block $H^{13}$, cross-connected to block $H^9$, to brush 7, to switch B, to field of motor No. 2, to reversing switch C, to armature of motor No. 2, to reversing switch C, to ground. Motor No. 2 is now connected in series with the resistance. With the switch B thrown up into position shown in dotted lines, motor No. 2 is cut out, and the lock prevents the cylinder from revolving beyond the fourth notch the same as before, and the circuit with the brushes on the line 1—1, is as follows: trolley T, switches X and Y, to cut-out Z, to lightning-arrester W, to magnet M, to brush 1, to block H′, cross-connected to block H², to brush 2, to resistance R, R′, to switch A, to field of motor No. 1, to reversing switch C, to armature of motor No. 1, to reversing switch C, to switch A, to brush 10 connected to brush 9, to block $H^{13}$, cross-connected to block $H^9$, to brush 7, to first pole of switch B, to ground. Motor No. 1 is now connected in series with the resistance.

With the other form of controller the details of the circuit are as follows: With the switch A, Fig. 19, thrown into the position shown in dotted lines, motor No. 1 is cut out, and the contact cylinder can only revolve as far as the fourth notch on account of the lock. With the switch A arranged as above and the brushes on the line 1—1, the circuit is as follows: trolley T, to magnet M, to brush 1, to block H′, cross-connected to block H², to brush 2, to resistance R, R′, to first pole of switch A, cross-connected to middle pole, to brush 9 connected to brush 8, to block $H^{11}$, cross-connected to block $H^7$, to brush 6, to switch B, to reversing switch C contact 3′, to armature of motor No. 2, to reversing switch C contact 4′, to switch B, to field of motor No. 2, to ground. With the switch B thrown up into position shown in dotted lines, motor No. 2 is cut out and the lock prevents the cylinder from revolving beyond the fourth notch the same as before, and the circuit with the brushes on the line 1—1, is as follows: trolley T, to magnet M, to brush 1, to block H′, cross-connected to block H², to brush 2, to resistance R, R′, to switch A, to reversing switch C contact 1′, to armature of motor No. 1, to reversing switch C contact 2′, to field of motor No. 1, to switch A, to brush 9 connected to brush 8, to block $H^{11}$, cross-connected to block $H^7$, to brush 6, to first pole of switch B, to ground. Motor No. 1 is now connected in series with the resistance.

It is obvious that many matters of detail which I have shown in connection with my controller do not necessarily take the exact form which I have used for illustration, but may be altered in any way without departing from the spirit of my invention.

What I claim as new, and desire to secure by Letters Patent, is—

1. The combination in an electric controller, of a switch having a multiplicity of contacts, and a blow-out magnet having a common pole piece extending from a common core to points adjacent to the several circuit-breaking points of the switch.

2. The combination in an electric controller, of a cylindrical switch having a series of insulated contact plates adapted to engage with a corresponding series of stationary contact fingers and a magnet having an extended pole piece reaching to points adjacent to the several circuit-breaking points between the said fingers and the said plates.

3. The combination in an electric controller, of a switch having a series of contacts, and a blow-out magnet provided with a pivoted pole piece reaching to points adjacent to the points of contact between the respective parts of the switch.

4. In a series-parallel controller, a cylinder carrying contacts and brushes bearing upon such contacts, the brushes having kinks or bends in their lengths; whereby the formation of grooves or furrows in the cylinder contacts is prevented.

5. In a series-parallel controller, a series of contacts upon a cylinder, a series of fixed contacts co-operating with them, and a series of insulating septa carried upon an arm and adapted to be interposed between the contacts, as described.

6. The combination in an electric controller, of a switch for connecting two motors either in series or in parallel, a reversing switch for the motors, and a lock for each switch controlled by the remaining switch.

7. The combination in an electric controller, of a switch for connecting two motors, either in series or in parallel, a switch for reversing the motors, a lock for the former switch, and a connection between the said lock and the latter switch by which the former is held from moving while the latter is in its middle position.

8. The combination in an electric controller, of a switch for connecting two motors, either in series or in parallel, a reversing switch, a lock for the latter switch, and a connection with the former switch whereby the latter is held against movement except when the former is in a position to put the two motors in series.

9. The combination in an electric controller, of a switch for putting two motors either in series or in parallel, a reversing switch, an intermediate lock for the two switches, and a removable handle for the reversing switch provided with a lock preventing its removal when in either of its extreme positions.

10. The combination with a switch, of a magnet having its poles adjacent to the contact-breaking points of the switch, and an arc deflector also adjacent to the contact-breaking points of the switch.

11. The combination with a switch, of a magnet having its poles adjacent to contact-breaking points of the switch, and an arc deflector consisting of a chute or chimney also adjacent to the contact breaking points of the switch.

12. The combination with a switch of a magnet having its poles adjacent to contact-breaking points of the switch, and an arc deflector consisting of a chute or chimney also adjacent to the contact-breaking points of the switch, and having its walls placed transversely to the line of the arc.

13. The combination with a switch having a multiplicity of contact-breaking points, of a magnet having its poles adjacent to said points, and an arc deflector consisting of a series of chutes or chimneys adjacent to the respective circuit-breaking points.

14. The combination in an electric controller, of a switch having a multiplicity of contacts, a blow out magnet provided with a pivoted pole piece reaching to points adjacent to points of contact on said switch and an arc deflector fastened to said pole pieces, provided with walls inclosing each of said contacts and adapted to be swung outward from said contacts.

15. The combination in an electric controller, of a switch for connecting two motors, either in series or in parallel, a cut-out switch for connecting one terminal of the respective motors to the opposite line, and a stop for the series parallel switch controlled by the cut-out switch.

16. The combination in an electric controller, of a switch for regulating two motors in series, and then changing them to parallel, a cut-out switch for each of the two motors, and a stop controlled by the cut-out switch for limiting the main switch to its regulating positions.

17. The combination in an electric controller, of a switch for regulating two electric motors in series by means of resistance, and subsequently putting them in parallel, of a cut-out switch for each motor having contacts arranged to leave the remaining motor in series with the said resistance.

18. The combination in an electric controller, of a switch for regulating two electric motors by means of a resistance, and then changing them from series to parallel, with a cut-out switch for each motor, a stop controlled by each of the two cut-out switches, limiting the movement of the main switch to those points at which the regulation by means of said resistance is effected.

In witness whereof I have hereunto set my hand this 19th day of December, 1893.

WILLIAM B. POTTER.

Witnesses:
JOHN W. GIBBONEY,
BENJAMIN B. HULL.